United States Patent

Moore

[15] 3,681,767

[45] Aug. 1, 1972

[54] MAGNETIC CORE MEMORY PROVIDING BOTH NON-ALTERABLE AND ELECTRICALLY ALTERABLE LOCATIONS

[72] Inventor: Dana W. Moore, Dover, Mass.

[73] Assignee: Honeywell Inc., Minneapolis, Minn.

[22] Filed: April 29, 1970

[21] Appl. No.: 32,801

[52] U.S. Cl. .340/174 M, 340/174 AC, 340/174 CR, 340/174 WA

[51] Int. Cl. ........................... G11c 5/02, G11c 11/06

[58] Field of Search......340/174 CR, 174 AC, 174 M

[56] References Cited

UNITED STATES PATENTS

| | | | |
|---|---|---|---|
| 3,564,517 | 2/1971 | McLean et al. | 340/174 M |
| 3,138,787 | 6/1964 | Hanf | 340/174 M |
| 3,478,333 | 11/1969 | Faulkner | 340/174 M |
| 3,222,645 | 12/1965 | Davis | 340/174 M |

OTHER PUBLICATIONS

IBM Technical Disclosure Bulletin, Vol. 3, No. 1, June 1960, pg. 45

*Primary Examiner*—James W. Moffitt
*Attorney*—Fred Jacob and Ronald T. Reiling

[57] ABSTRACT

A read only memory utilizes magnetic cores rotated 90° from the normal orientation about the read/write coincident wires so that their magnetic state cannot be switched, thereby indicating the storage of logical zeroes regardless of the actual state stored. Logical ones may be stored by orienting the magnetic cores in their normal orientation, so that they can be switched. The read only memory may also be combined at random locations in a standard read/write magnetic core memory thereby sharing the read/write logic, sense logic and inhibit logic associated with a single memory system.

12 Claims, 2 Drawing Figures

PATENTED AUG 1 1972

3,681,767

INVENTOR
DANA W. MOORE
BY
[signature]
ATTORNEY

INVENTOR
DANA W. MOORE
BY John S. Solakian
ATTORNEY

MAGNETIC CORE MEMORY PROVIDING BOTH NON-ALTERABLE AND ELECTRICALLY ALTERABLE LOCATIONS

BACKGROUND OF INVENTION

A. Field of the Invention

The present invention relates generally to magnetic core memories and more particularly to magnetic core memories having both non-alterable and electrically alterable locations.

B. Description of the Prior Art

A type of magnetic core memory well known in the art employs an arrangement of cores in electrical coincidence with a geometric array of rows and columns. A grid of selection wires and a sense wire is used to provide conductive paths for information storage and retrieval. Each selection wire is conductively coupled to or threaded through each of the cores in an associated row or column. A sense wire is threaded through all of the cores. No two selection wires jointly thread more than a single core. Information is read into a designated core by pulsing with a signal of like polarity each of the selecting wires threading that core. The strength of the combined signal is such that through magnetic coupling between the wire and the core, the core is driven to magnetic saturation in a direction corresponding to the polarity of the signal. Retrieval of the information stored in a designated core is accomplished by again pulsing the selected wires associated with that core. A change in the magnetic state of the core will induce an output signal in the sensing wire. If there is no change in state, the polarity of the pulsing signal corresponds to the direction of magnetic saturation and little or no signal is induced in the sensing wire.

General purpose computers employ such memories into which new information may be periodically written. Currently, however, there is an increasing need for special purpose computers having memories, or at least portions of memories, in which the information stored is unalterable. Such a memory system need have only a read capability and is usually designated as a read only memory.

Some prior art memory systems utilizing magnetic core read only memories employ wired core memories wherein the sense wire is either threaded through the cores or circumvents the cores thereby in the first case, allowing normal sense operation, whereas in the latter case, a change in state of such core would not be sensed by the sensing wire. In this type of memory, it can be readily seen that special wiring configurations must be employed in order to wire in the logical one and logical zero states. Another prior art magnetic core read only memory device employs permanent magnets in close orientation to the magnetic cores which are to indicate logical zeros. Such permanent magnet is oriented about the magnetic core so that a change in state thereof will be inhibited. Such a memory array employing permanent magnets is disadvantaged in that the permanent magnets take up room causing the memory array to be significantly increased in size. Also such an arrangement causes increased cost due to the added permanent magnets. In another prior art magnetic core read only memory device logical zeros are indicated by eliminating magnetic cores at the locations where logical zeros are to be stored. By eliminating such cores, however, this technique produces higher disturbing or noise signals on the sensing wire due to half-select current noise, which noise is generated when a core receives only one-half of the current required for switching.

It is therefore an object of the present invention to provide an improved magnetic core memory having both non-alterable and electrically alterable locations.

It is another object of the invention to provide a magnetic core memory having both non-alterable and electrically alterable locations while still providing a substantial reduction in the disturbing signals produced on the common sensing wire by half-select currents.

It is a further object of the invention to provide an improved magnetic core memory having both non-alterable and electrically alterable locations in combination with a read/write magnetic core memory.

SUMMARY OF THE INVENTION

The purposes and objects of the present invention are satisfied by providing a plurality of magnetic cores in a row and column matrix. A plurality of row and column selection wires are provided to intersect and magnetically couple one of said cores at each of the crossover points of the selection wires. A first plurality of magnetic cores is oriented in the normal position about the selection wires so that a change in magnetic state of such cores may be effected by currents on corresponding row and column selection wires. A sensing wire is provided which intersects each of the magnetic cores in a selected direction in order to minimize the noise or disturbing signals produced on the sensing wire by half-select currents. An inhibit wire may also be provided so as to intersect the magnetic cores. This above-mentioned magnetic core memory may also be utilized in combination with a standard type read/write magnetic core memory wherein the row and column selection wires, as well as the sensing wire, are common to both memories thereby allowing use of common read/write and sensing logic. If the inhibit wire is a wire separate from the sensing wire, it may also be common to both memories or may be utilized in the standard read/write memory alone so that the read only memory does not utilize the inhibit wire.

BRIEF DESCRIPTION OF THE DRAWINGS

The advantages of the foregoing configuration of the present invention will become more apparent upon reading the accompanying detailed description in conjunction with the Figures in which.

DETAILED DESCRIPTION OF THE PREFERRED EMBODIMENTS

Figure 1:
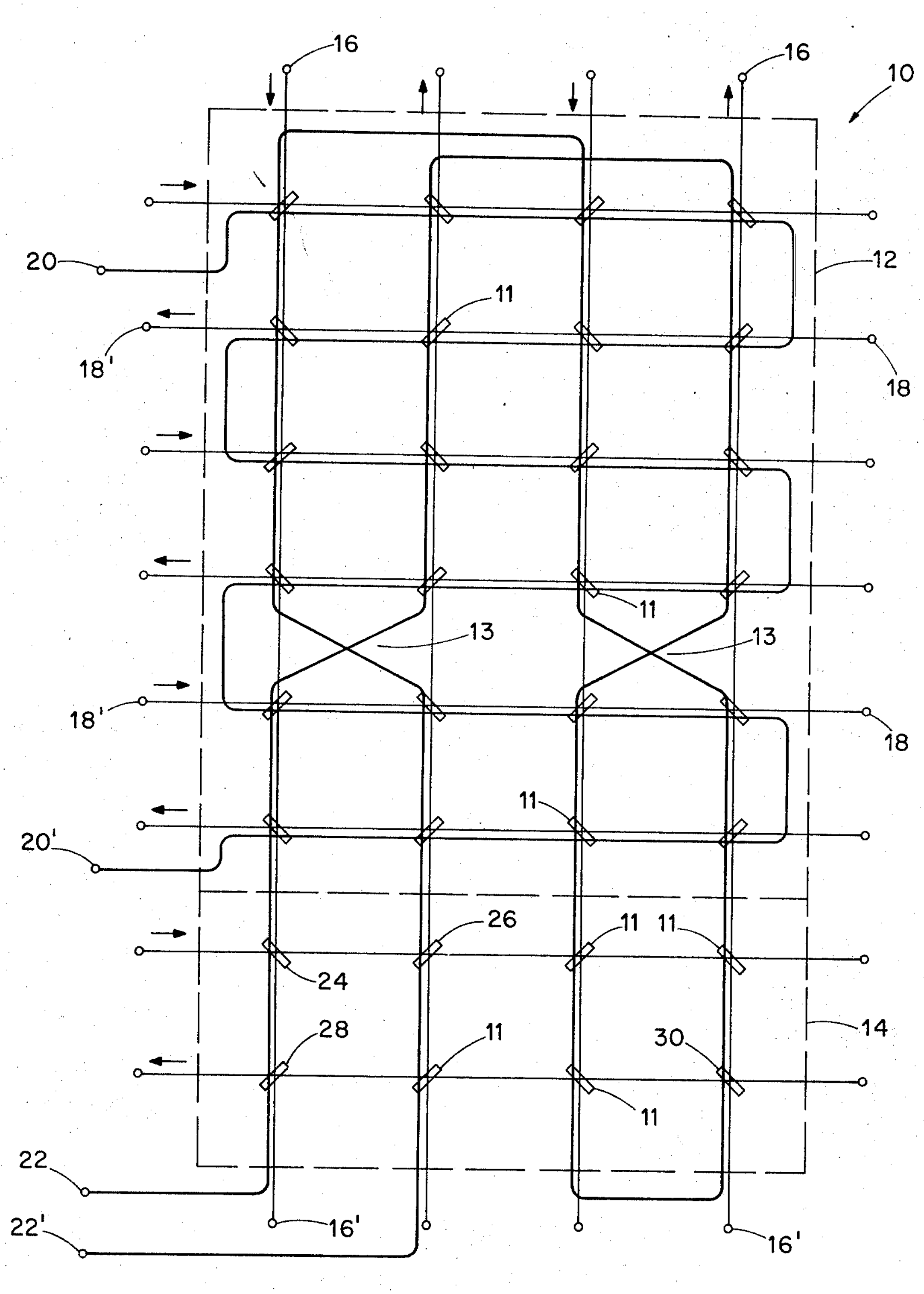
FIG. 1 is a schematic diagram of a first embodiment of the present invention wherein a standard read/write memory is combined with a read only memory, the inhibit wire being shown common to the read/write memory only.

In FIG. 1 there is illustrated a memory 10 having a standard read/write memory 12 and a read only memory 14. Included in each of the memories 12 and 14 are bistable magnetic cores 11 oriented so that their magnetic state may be changed. Also common to both memories 12 and 14 are X selection wires 16–16' and Y selection wires 18–18'. Each crossover of the X and Y selection wires intersects a single core. Also common to both memories is a sense wire 22–22' herein shown in a bow-tie arrangement so as to reduce noise signals produced thereon by half-select currents. As can be seen, the bow-tie generally indicated at 13 equally divides the memory 10 in the X axis direction so that half the cores in the X direction are sensed in one direction while the other half are sensed in the opposite direction. Also shown in FIG. 1 is an inhibit wire 20–20' which is common in this example to the memory 12 only. Memory 14 in addition to providing electrically alterable cores 11, also provides cores 24, 26, 28 and 30 which are oriented in a direction orthogonal to the alterable cores 11 so that their magnetic state cannot be changed.

The operation of the standard coincident current read/write memory 12 is well known. However its operation will now be briefly discussed. The read time precedes the write time and information sensing is conducted during the read time whereas an inhibit operation is conducted during write time. The direction of current in the X and Y selection wires during read time is shown by the small arrows in the figures. The direction of current in the X and Y selection wires during write time is opposite the direction shown by such arrows. The coincident-current magnetic core memory depends upon the coincidence of two half-currents to read data from or to write data into the cores. Two additive half-current pulses will set the core to the ONE state, while two half-current pulses applied in the opposite direction will reset the core to the ZERO state. Only one core in the single matrix shown in FIG. 1 may be switched in a single read/write cycle since only one X and Y selection wire will be addressed.

To obtain an indication of the condition of the flux (the magnetic state) in a memory core, the state of the core must be switched. If the addressed core is storing a ONE, the read selection currents which are in a direction to write a ZERO into the core, change or switch the state of the core to ZERO. If the addressed core was previously in the ZERO state, the read selection currents will have no effect on the core. When the core is switched from the ONE to the ZERO state, the rapid change in flux from positive saturation to negative saturation induces a voltage pulse on sense wire 22–22'. Therefore, the presence of a voltage pulse on the sense wire during the read time indicates that a ONE has been stored in the addressed core. If no voltage pulse occurs on the sense wire during the read time, a ZERO is indicated.

The inhibit wire enables a computer word or inStruction to be written into memory at a selected address location. Each plane of a multi-plane memory, a single plane of which is shown, requires an individual inhibit wire. As stated before, to write information into memory, half-current pulses in the direction opposite to those generated for the read time are applied to the addressed X and Y selection wires to switch the affected core. Since the core in the memory plane shown has been cleared to the ZERO state prior to the application of the write half-currents, these write currents operate to switch the addressed core to the ONE state. If the incoming data (whether it be new or restored data) dictates that a ZERO is to be written into the addressed core, the inhibit wire is used to prevent the core from switching to the ONE state when the write currents are generated. This is done by applying a current in the inhibit wire 20–20' in a direction opposite the Y write selection current as shown by the small arrow.

Having discussed the operation of standard read/write memory 12, the operation of the read only memory 14 will now be discussed. The cores 11 in memory 14 may be switched in magnetic state since the X and Y selection currents add to provide the necessary magnetomotive force required to effect switching. The other cores 24, 26, 28 and 30 cannot be so switched because as can be seen by the arrows indicating the direction of the selection currents, the selection currents pass through the cores in opposite directions. Thus the core orientation prevents the addition of the X and Y half-select currents. Rather, the X and Y half-select currents substantially cancel each other so that substantially no magnetic flux is generated. Thus such cores cannot be switched and will always indicate a ZERO state regardless of the state stored therein.

Thus, each of the magnetic cores 11 in memory 14 are utilized to store a ONE state so that during read time this ONE state is sensed when the core 11 is switched to the ZERO state. During the write time, the ONE state is restored in the core 11 by conventional means, and the inhibit current is not required. However the cores 24, 26, 28 and 30, not being switchable in magnetic state, do not produce a change in magnetic flux. Accordingly, a voltage pulse will not be generated, thereby indicating that the particular core stored a ZERO state even though it in fact may have a ONE state stored therein.

It can also be seen that the half-select current noise which is generated by those cores receiving only one of the X and Y selection currents is substantially eliminated along the X axis regardless of the orientation of the cores on the X axis. This is attained because the sense wire 22–22' is arranged in a bow-tie configuration so that one-half of the cores on the X axis are intersected by the sense wire in the same direction as the X selection wire through those cores whereas the other half of the X axis cores are intersected by the sense wire in the opposite direction as the X selection wire through these cores. Thus the polarity of the noise pulses induced on the sense wire 22–22' substantially alternates in the X axis for each half of the memory 10. Half-select current noise is not cancelled along the Y axis regardless of the orientation of the cores as effectively as was just described for the X axis. This is so because a core oriented to indicate a ZERO state might upset the alternation in polarity of the noise pulse so that cancellation is not achieved. Any noise thus generated along the Y axis may be effectively inhibited from affecting the operation of the memory system by choosing the timing of the X and Y read/write selection currents so that the Y selection current is turned on before the X selection current. The noise pulses, if any, are therefore generated on the rise and fall of the Y selection current since there is no guarantee that there will be substantial cancellation of the noise pulses on this axis. There is no such noise problem due to the X selection current, regardless of the orientation of the cores, therefore noise will not mask the sensed information. Thus by strobing for the sensing and inhibiting operations during the X selection current time, the noise generated by the rise of the Y half-select current which is not effectively cancelled is not of any consequence since the strobing occurs between generation of the noise pulses.

The inhibit wire 20–20′ is shown for the standard type memory 12. However it should be understood that the inhibit wire 20–20′ may have also been threaded through the cores in memory 14. However, it is desirable to block the inhibit current in the read only memory 14 in order to protect against inadvertent setting of the cores 11 therein to the ZERO state, either through circuit failure or program error. That is, the cores 11 are switched to the ZERO state to sense the ONE state and if the inhibit current is generated during the write time, then the ZERO state will remain. There are two approaches to the blocking of the inhibit current. One is to eliminate the inhibit wire in the read only memory 14 as is shown in FIG. 1. The other approach is to logically gate the inhibit current for the read only memory cores, based on the addresses of such cores. Thus if the inhibit wire is used through memory 14, the addresses of the cores in the memory 14 would have to be indicated by gating logic not shown so that the inhibit current through such inhibit wire would not be generated when a read only memory location is addressed. If there is an inadvertent error and the inhibit current is allowed through the read only memory location, the magnetic cores 11 in memory 14 will remain in the ZERO state. They may be reset to the ONE state by a write operation however. One advantage in using an inhibit wire throughout the entire memory 10 is that the read only memory 14 may be located in memory 10 at random locations and in addition no special wiring of the inhibit wire is required. The inhibit wire is threaded in a normal manner throughout the entire memory 10. However, extra logic is required in order to detect the read only memory locations. By deleting the inhibit wire in the memory 14, no detection is required of the read only memory locations and the expense of wiring the inhibit wire is decreased where several such similar organizations are utilized.

Another advantage gained from the use of an inhibit wire will be seen in regard to the following potential problem which is encountered when the memory 14 is first used. If a read only memory core which is to indicate a ZERO state is not in positive or negative saturation, the half-select current noise will be slightly higher than if there was solid saturation. A full read/write cycle in the read only memory cores 11 storing the ONE state rectifies this. However the other ZERO indicating cores 24, 26, 28 and 30 cannot be so switched by the conventional selection currents shown. However for those ZERO indicating cores not on the addressed Y selection wire, but on the addressed X selection wire, the X selection current and the inhibit currents will add to a full select current at write time so that the ZERO indicating cores will become saturated. Of course, such ZERO indicating cores could have been so saturated without the use of the inhibit wire by reversing the polarity of one of the selection currents so that the X and Y selection currents will add. However this is not as desirable as using the inhibit wire.

Figure 2:
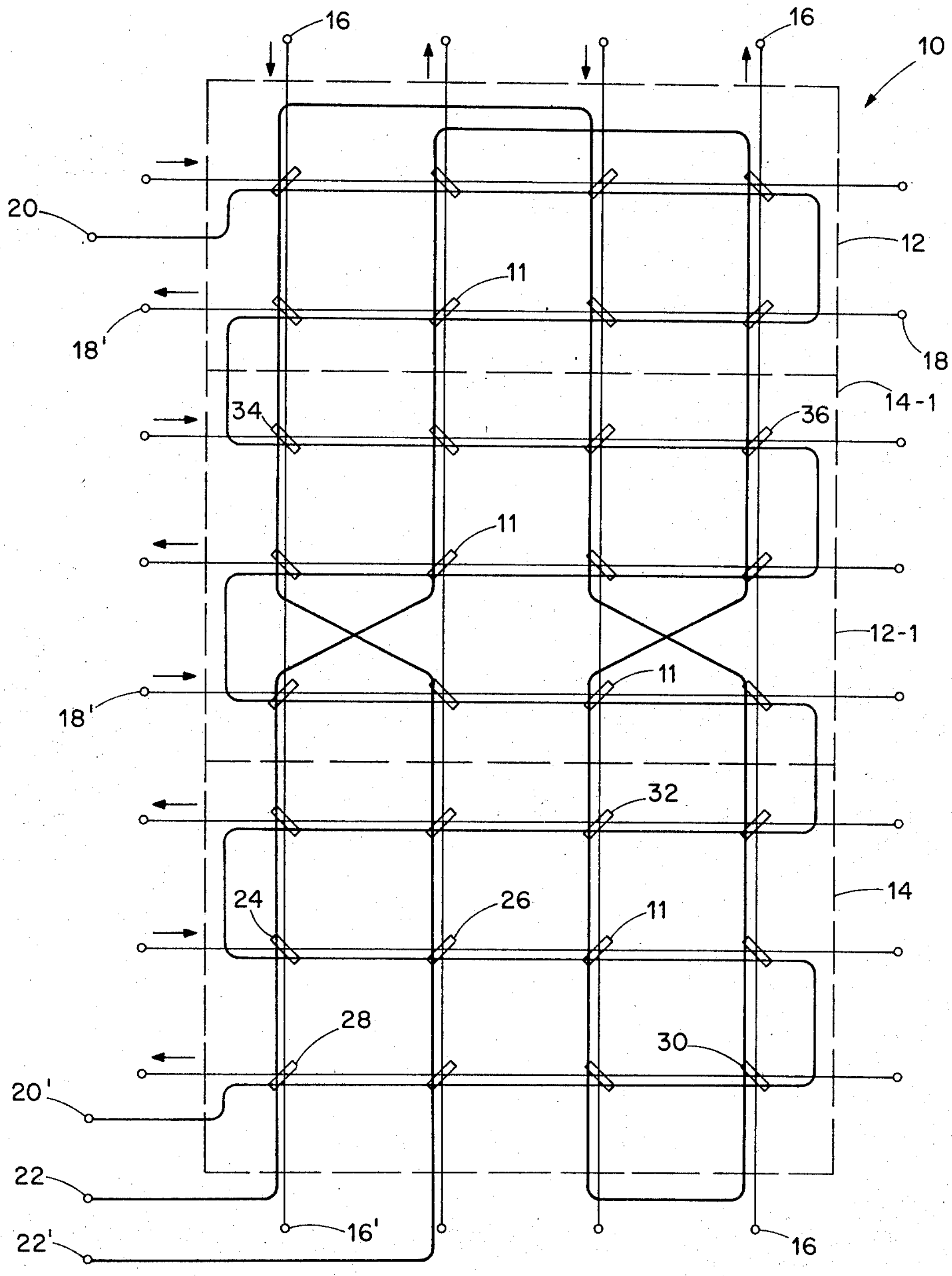
FIG. 2 is a schematic diagram of a second embodiment of the present invention illustrating a read/write magnetic core memory having a read only memory combined at random locations therein, the inhibit wire being shown common to both memories.

FIG. 2 illustrates the use of the inhibit wire 20–20′ throughout memory 10 so as to be included in standard memories 12 and 12-1, as well as read only memories 14 and 14-1. In FIG. 2 memory 14 includes three columns of Y selection wires. In addition, read only memory section 14-1 is shown in a random location between memories 12 and 12-1 so as to illustrate the random location capability of the memory 10. Magnetic cores 24, 26, 28, 30 and 32 in memory 14, as well as cores 34 and 36 in memory 14-1, are oriented so that they may not be altered in magnetic state and thereby are set to indicate logical zeros. All other cores 11 in memory 10 are oriented in the normal position so that their magnetic state may be altered.

It has thus been seen that a read only memory may be organized utilizing magnetic cores oriented in a first direction so that their magnetic state may be altered and in a second direction rotated 90° from the alterable cores so that their state may not be altered, the first such cores storing and indicating logical ones and the second of such cores indicating logical zeros regardless of the state stored therein. It has also been seen that by utilizing a bow-tie type sense wire that the cores along the X axis as illustrated may be oriented in any direction while still providing effective cancellation of the half-select current noise.

It should be further understood that other type memory organizations may incorporate the rotated core technique of storing logical zeros. For example, a magnetic core memory utilizing X and Y selection wires and a common sense and inhibit wire may have been used. In addition a memory as shown in FIG. 1 or FIG. 2 may have been utilized with the exception that the inhibit wire run parallel to the X selection wires 16–16′ to provide noise cancellation on the X axis. Further, a diagonal sense line through the core matrix may also be possible, however difficulty in threading the sense wire therethrough would make it impractical. It should also be understood that the read only memory locations may be placed at random and may be not only organized as shown grouped about the Y axis, but may have been organized about the X axis. Also although a single plane memory is shown a multiplane memory is also anticipated such that each core in a plane would store a bit of a word, the remaining bits of such word being stored in the other planes of the memory.

Having now described the invention, what is claimed as new and novel, and for which it is desired to secure Letters Patent is:

1. A magnetic core matrix comprising a plurality of bistable magnetic cores capable of storing first and second magnetic states, said cores arranged in a row and column matrix, each of said cores intersected by row and column selection wires and each of said cores selected by signals occurring simultaneously on the respective row and column selection wires, some of said cores oriented so that their magnetic state may be switched when selected and others of said cores oriented so that their magnetic state cannot be switched when selected, said others of said cores indicating said first state when selected regardless of which of said first and second states is stored therein.

2. A magnetic core matrix comprising:

A. a plurality of magnetic cores;

B. a plurality of row and column selection wires forming a plurality of crossover points, each of said wires intersecting and magnetically coupling to one of said cores at each of said crossover points;

C. wherein some of said cores are oriented about said selection wires so that a change in magnetic state of said some of said cores may be effected;

D. wherein others of said cores are oriented about said selection wires at random locations among said some of said cores so that a change in magnetic state of said others of said cores will not be effected when any one of said others of said cores is addressed for readout by signals occurring on the respective row and column selection wires; and E. a sense wire which intersects each of said cores in a selected direction.

3. A matrix as defined in claim 2 wherein said some of said cores are oriented diagonally about the crossover of said selection wires in a first magnetic coupling direction and wherein said others of said cores are oriented diagonally about the crossovers of said selection wires in a second magnetic coupling direction, said first and second magnetic coupling directions spaced substantially 90° apart.

4. A coincident current magnetic core memory comprising:

A. a plurality of magnetic cores having a substantially rectangular hysterisis curve, said cores being arranged in rows and columns;

B. a plurality of row selection wires adapted to receive half-select currents, each of said row selection wires intersecting a row of said cores;

C. a plurality of column selection wires adapted to receive half-select currents, each of said column selection wires intersecting a column of said cores;

D. means for generating said half-select currents on specified ones of said row and column selection wires in order to select one of said plurality of cores for readout;

E. some of said cores oriented so that the receipt of half-select currents on corresponding row and column selection wires may cause a change in state of a first corresponding core selected for readout; and F. others of said cores oriented so that the receipt of half-select currents on corresponding row and column selection wires will not cause a change in state of a second corresponding core selected for readout.

5. A matrix as defined in claim 4 wherein said half-select currents on corresponding row and column selection wires of said first corresponding core add to produce a magnetic field capable of switching the state of said first corresponding core and wherein said half-select currents on corresponding row and column selection wires of said second corresponding core substantially cancel to produce a minimal magnetic field incapable of switching the state of said second corresponding core.

6. A magnetic core memory matrix including both non-alterable and alterable locations, said matrix comprising:

A. a first plurality of magnetic cores in row and column matrix arrangement having row and column selection wires which each intersect one of said cores at each of the crossover points of said selection wires, said cores and selection wires arranged so that a change in state of said cores may be effected;

B. a second plurality of magnetic cores in row and column matrix arrangement having row and column selection wires, said column selection wires of said second plurality of magnetic cores common to the column selection wires of said first plurality of magnetic cores, said row and column selection wires of said second plurality intersecting one of said second plurality of cores at each of the crossover points of said selection wires, said second plurality of cores and said selection wires arranged so that a change in state of some of said cores of said second plurality of cores may be effected when any of said some of said cores is addressed and so that a change in state of others of said cores of said second plurality of cores may not be effected when any of said others of said cores is addressed; and C. a sense wire which intersects each of said cores of said first and second plurality of cores in a selected direction.

7. A matrix as defined in claim 6 wherein said some of said cores are oriented diagonally about the crossovers of said selection wires in a first magnetic coupling direction and wherein said others of said cores are oriented diagonally about the crossovers of said selection wires in a second magnetic coupling direction, said first and second magnetic coupling directions spaced substantially 90° apart.

8. A matrix as defined in claim 6 further including an inhibit wire which intersects each of said cores of said first plurality of cores in a magnetic coupling direction which may prohibit a change in state of said cores of said first plurality of cores.

9. A matrix as defined in claim 8 wherein said inhibit wire also intersects each of said cores of said second plurality of cores in a direction which may prohibit a change in state of said cores of said second plurality of cores.

10. A matrix as defined in claim 6 wherein said sense wire is magnetically coupled to one-half of said cores in a first direction and to the other half of said cores in a second direction whereby any noise generated on said sense wire due to currents through those cores not receiving a full selection current is substantially cancelled.

11. A matrix as defined in claim 10 wherein said sense wire is magnetically coupled to a column of said cores such that said noise developed therein will be substantially cancelled regardless of the orientation of said cores in said column of said cores.

12. A matrix as defined in claim 11 wherein said sense wire is magnetically coupled in one direction to one-half of said cores in said column of cores and is magnetically coupled in an opposite direction to the other half of said cores in said column of cores.

* * * * *